GEORGE W. DUTTON.
Improvement in Harness.
No. 120,049. Patented Oct. 17, 1871.
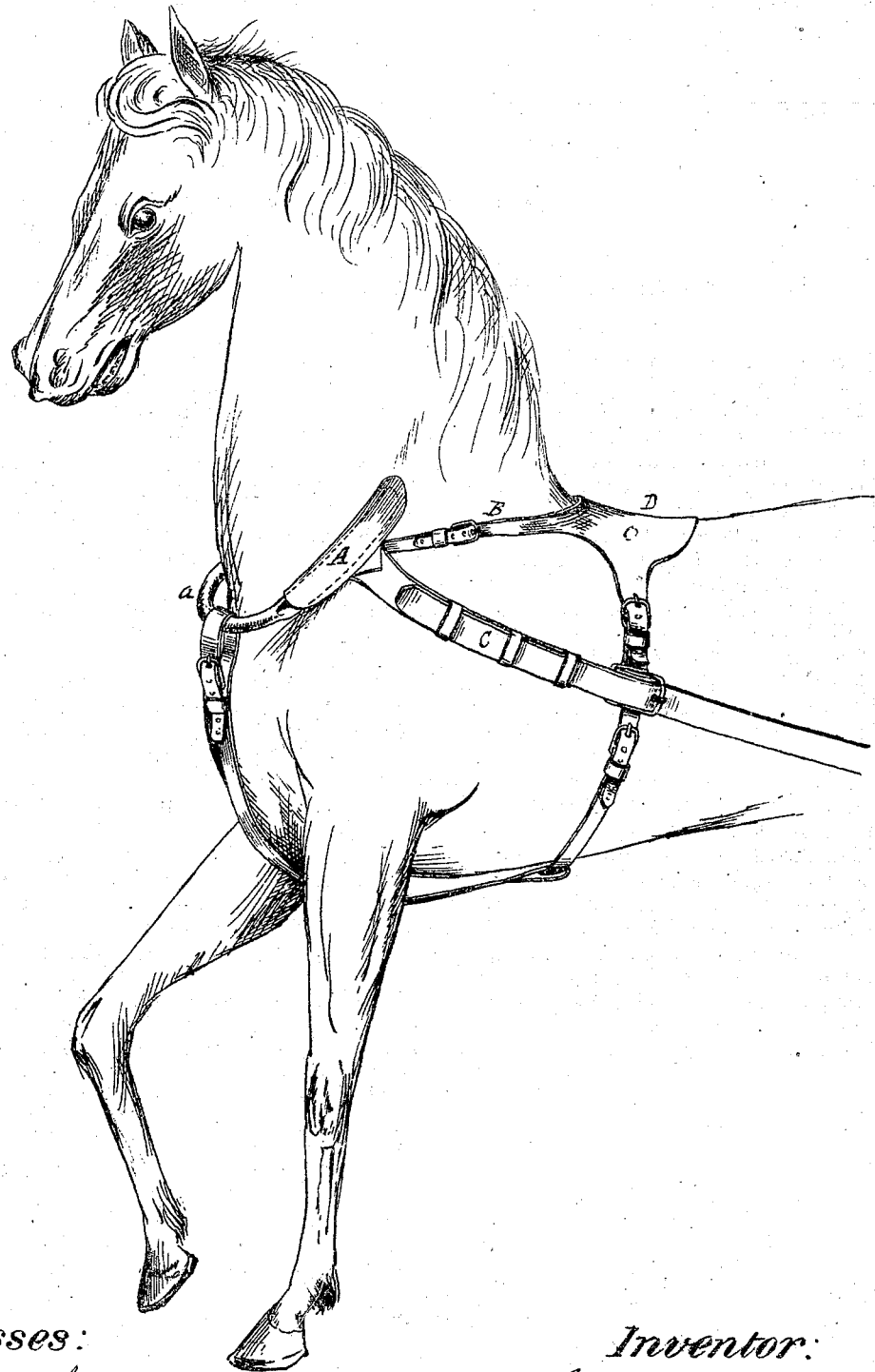
Witnesses:
Inventor:

120,049

UNITED STATES PATENT OFFICE.

GEORGE W. DUTTON, OF TOMALES, CALIFORNIA, ASSIGNOR TO HIMSELF AND JOHN ASHTON, OF SAME PLACE.

IMPROVEMENT IN HARNESS.

Specification forming part of Letters Patent No. 120,049, dated October 17, 1871.

*To all whom it may concern:*

Be it known that I, GEORGE W. DUTTON, of Tomales, in the county of Marin and State of California, have invented a new and useful Improvement in Harness; and I do hereby declare that the following is a full, clear, and exact description thereof, which will enable others skilled in the art to make and use the same, reference being had to the accompanying drawing forming part of this specification.

The drawing represents my improved harness applied to the shoulders of a horse.

The nature of my invention consists in arranging the draft so as to throw the strain upon the proper point of the shoulder, and at the same time to relieve the neck and withers free from the harness.

To enable others to understand and use my invention I will proceed to state the exact manner in which I have carried it out.

The breast-bar *a* is properly fitted to the horse, and has rigidly attached at each end a metal plate covered with the pad A, and which fits against the shoulder at a point immediately above the breast, as shown in the drawing. Connected with the said plates are the straps B, which suspend the collar from the saddle or pad D and hold it in place against the shoulders of the horse. By this application of the breast-plate or collar it is evident I avoid pressure on the jugular vein and wind-pipe of the horse, while the mane of the animal is kept free from damage and the withers from being rubbed. As the breast-plate or collar passes obliquely on the sides of the neck, as shown in the drawing, and in front of the scapula in such a manner as to give a good bearing for resisting the pulling strain, the draft is placed where it should be.

I am aware that the ordinary breast-plate has been suspended by an attachment to the water-hook; and I am also aware that attempts have been made to relieve the pressure on the wind-pipe by bowing out the front of an ordinary breast-strap; but my invention consists in the peculiar shape of the breast, and the novel manner of its application.

Having thus described my invention, what I claim as new, and desire to secure by Letters Patent, is—

The collar or breast-plate *a*, having its upper ends flattened and padded to adapt itself to the shoulder-blades or where the draft should come upon the horse, and supported by straps B from the saddle D, in the manner shown and described.

G. W. DUTTON.

Witnesses:
ANDREW L. FISHER,
PETER MORRISSY.

(72)